(12) United States Patent
Tanaka et al.

(10) Patent No.: US 11,783,586 B2
(45) Date of Patent: Oct. 10, 2023

(54) INFORMATION PROCESSING APPARATUS, INFORMATION PROCESSING METHOD AND PROGRAM MEDIUM

(71) Applicant: Toyota Jidosha Kabushiki Kaisha, Toyota (JP)

(72) Inventors: Yurika Tanaka, Yokosuka (JP); Daiki Kaneichi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 17/130,438

(22) Filed: Dec. 22, 2020

(65) Prior Publication Data

US 2021/0199452 A1    Jul. 1, 2021

(30) Foreign Application Priority Data

Dec. 25, 2019 (JP) .................... 2019-234868

(51) Int. Cl.
| | |
|---|---|
| G06Q 50/00 | (2012.01) |
| G06Q 10/00 | (2023.01) |
| G06V 20/52 | (2022.01) |
| G01C 21/34 | (2006.01) |
| G01C 21/36 | (2006.01) |
| B60W 30/02 | (2012.01) |
| G05B 11/32 | (2006.01) |
| G06Q 50/30 | (2012.01) |
| G06Q 10/02 | (2012.01) |
| G06F 18/22 | (2023.01) |
| G06V 40/20 | (2022.01) |

(52) U.S. Cl.
CPC ............. *G06V 20/52* (2022.01); *B60W 30/02* (2013.01); *G01C 21/3438* (2013.01); *G01C 21/3617* (2013.01); *G05B 11/32* (2013.01); *G06F 18/22* (2023.01); *G06Q 10/02* (2013.01); *G06Q 50/30* (2013.01); *G06V 40/20* (2022.01)

(58) Field of Classification Search
CPC .............................. G06Q 50/30; G06Q 10/02
See application file for complete search history.

(56) References Cited

U.S. PATENT DOCUMENTS

| | | | |
|---|---|---|---|
| 2017/0109467 A1 | 4/2017 | Shimizu et al. | |
| 2017/0193627 A1 | 7/2017 | Urmson et al. | |
| 2018/0365485 A1* | 12/2018 | Chen | G06N 7/01 |
| 2019/0171988 A1* | 6/2019 | Kwatra | G06Q 50/30 |
| 2020/0193335 A1* | 6/2020 | Sekhar | G06Q 10/025 |
| 2020/0326194 A1* | 10/2020 | Wang | G05D 1/0293 |
| 2020/0379140 A1* | 12/2020 | Kostrun | G06V 10/80 |
| 2020/0382335 A1* | 12/2020 | Trim | G06N 20/00 |

(Continued)

FOREIGN PATENT DOCUMENTS

| | | |
|---|---|---|
| JP | 2002297979 A | 10/2002 |
| JP | 2016058029 A | 4/2016 |
| JP | 2018120644 A | 8/2018 |

(Continued)

*Primary Examiner* — Matheus Ribeiro Stivaletti
(74) *Attorney, Agent, or Firm* — Dinsmore & Shohl LLP

(57) ABSTRACT

An information processing apparatus, comprises a controller configured to acquire sensor data from a plurality of sensors installed in a building; generate action information on a user in the building based on the acquired sensor data; and estimate a time of the user's going out based on the generated action information.

12 Claims, 16 Drawing Sheets

(56) References Cited

U.S. PATENT DOCUMENTS

2021/0271888 A1* 9/2021 Yamauchi .............. G06V 20/52

FOREIGN PATENT DOCUMENTS

| JP | 2019-505899 A | | 2/2019 | |
|---|---|---|---|---|
| JP | 2019074990 A | * | 5/2019 | ..... G06Q 10/063116 |
| JP | 2019207587 A | | 12/2019 | |
| WO | 2015155916 A1 | | 10/2015 | |

* cited by examiner

| ACTION PATTERN BEFORE GOING OUT | DESTI-NATION | ROUTE OF MOVEMENT | MEANS OF TRANSPORTATION |
|---|---|---|---|
| P1 | X1 | ... | AUTOMOBILE |
| P2 | X2 | ... | PERSONAL MOBILITY |
| P3 | X3 | ... | WALK |

FIG. 15

INFORMATION PROCESSING APPARATUS, INFORMATION PROCESSING METHOD AND PROGRAM MEDIUM

CROSS REFERENCE TO RELATED APPLICATION

This application claims priority to Japanese Patent Application No. 2019-234868, filed on Dec. 25, 2019, incorporated herein by reference in its entirety.

BACKGROUND

Technical Field

The present disclosure relates to a technique of supporting movement of a user.

Attempts have been made to provide services by sending automatic driving cars designed for various purposes. For example, Patent document 1 discloses a system that estimates that a user needs means of transportation and sends a vehicle.

CITATION LIST

Patent document 1: Japanese Translation of PCT International Application Publication No. 2019-505899

SUMMARY

An object of the present disclosure is to estimate a time of a user's going out in order to send a vehicle.

The present disclosure in its one aspect provides an information processing apparatus, comprising a controller configured to acquire sensor data from a plurality of sensors installed in a building; generate action information on a user in the building based on the acquired sensor data; and estimate a time of the user's going out based on the generated action information.

The present disclosure in its another aspect provides an information processing method, comprising a step of acquiring data from a plurality of sensors installed in a building; a step of generating action information on a user in the building based on the acquired data; and a step of estimating a time of the user's going out based on the generated action information.

Another aspect may be a program that makes a computer the information processing method performed by the information processing apparatus described above, or a computer-readable memory medium that non-temporarily stores the program.

According to the present disclosure, the time of a user's going out can be estimated without the need of data concerning an action schedule of the user.

BRIEF DESCRIPTION OF THE DRAWINGS

FIG. 15 illustrates an example of a going-out history according to the third embodiment.

DETAILED DESCRIPTION

Figure 1:
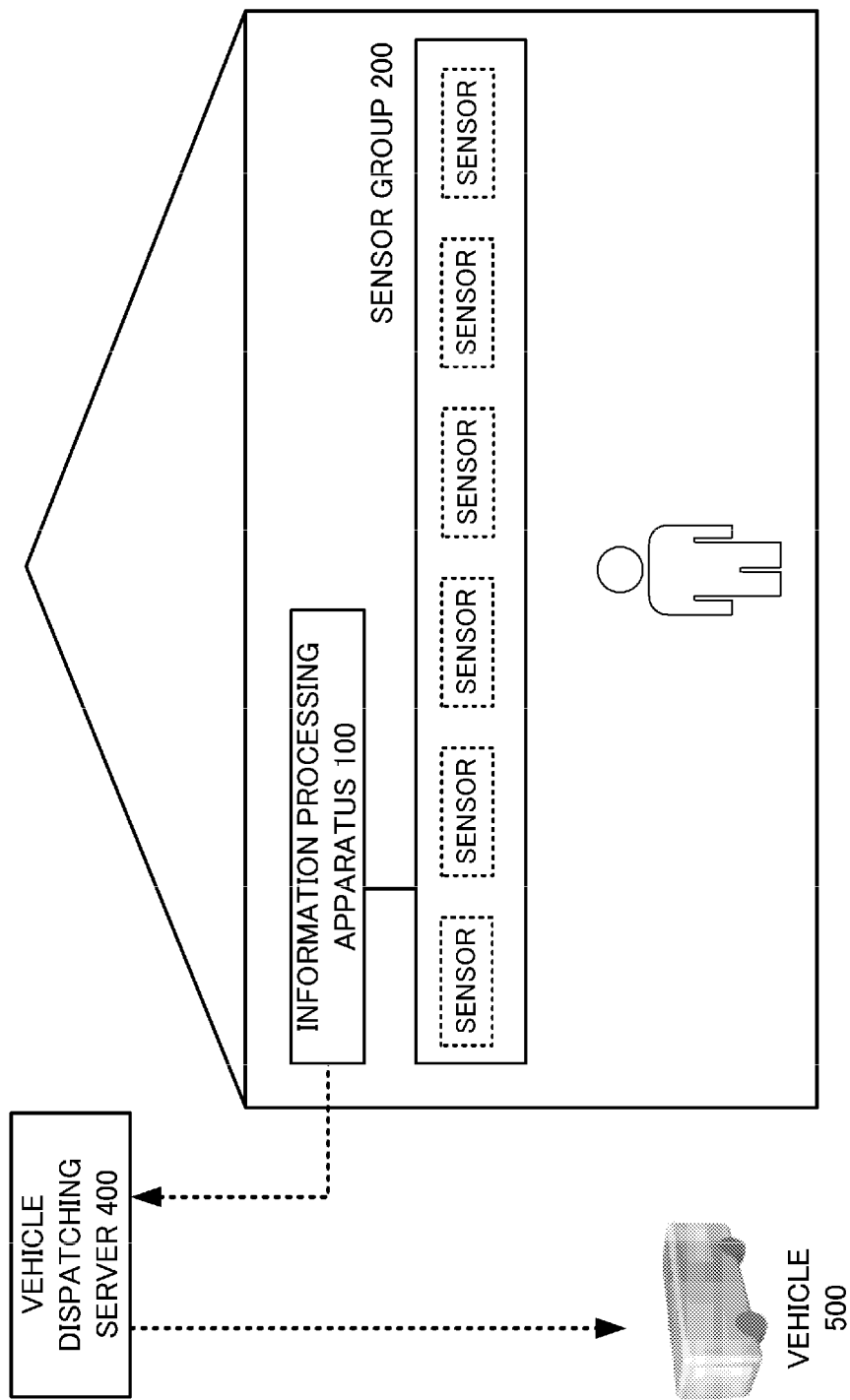
FIG. 1 is a diagram for illustrating an overview of a vehicle dispatching system.

Services that support movement of a user by sending an automatic driving vehicle to the user are under study. As such a service, an on-demand service that sends an automatic driving vehicle to an area where the public transportation is poor is contemplated.

To call an automatic driving vehicle, an operation by the user is needed. However, it is troublesome, particularly for elderly people, to perform the calling operation in advance each time the user is going to go out. Although a vehicle can be automatically dispatched based on a schedule input in advance, it is difficult to follow a change of the schedule.

To solve the problem, according to an embodiment, an information processing apparatus that automatically estimates a time when a user in a building will go out is used. The building includes the house of the user or any other facility. By automatically estimating the time of going out, means of transportation can be allocated in advance.

The information processing apparatus according to the embodiment has a controller configured to: acquire sensor data from a plurality of sensors installed in the building; generate action information on the user in the building based on the acquired sensor data; and estimate a time of the user's going out based on the generated action information.

The sensor may be any sensor as far as the sensor is installed in the building, such as a sensor that detects the location of the user (such as in which room the user is) or a sensor that detects an action of the user (such as going to bed, getting up, having a meal, or face washing). The sensor may be a sensor that detects that particular equipment in the building is used.

The controller generates the action information on the user based on the sensor data obtained from the plurality of sensors. The action information is data that represents what action the user is performing in the building. The action information may be data that represents actions of the user on a time-series basis.

If a person has a fixed everyday routine, the person is likely to perform a particular action pattern before going out. Therefore, based on the action information obtained by sensing, the time of the user's going out can be estimated.

The sensor data may be data that indicates a location of the user in the building and/or a utilization of one or more pieces of equipment installed in the building.

The location of the user in the building can be determined based on data obtained from the sensors installed at a plurality of locations. The utilization of equipment can be obtained from a plurality of pieces of equipment.

The action information may be data that indicates the location of the user in the building and/or the utilization of one or more pieces of equipment installed in the building on a time-series basis.

The action information may be time-series data that indicates in which room the user is, time-series data that indicates which equipment (such as a computer or an electrical appliance) the user used, or a combination thereof.

The information processing apparatus may further has a storage configured to store data that represents a typical action pattern performed by the user before going out, and the controller may estimate the time of the user's going out based on a result of comparison between the action information and the action pattern.

The time of going out can be estimated with higher precision by storing a standard action pattern performed by the user before going out and comparing the obtained action information with the standard action pattern.

The comparison may be a simple comparison, or the degree of similarity of the action pattern may be determined with a machine learning model.

The information processing apparatus may further has: a storage configured to store data that represents a typical action pattern performed by each of a plurality of users before going out, and the controller may estimate the time of any of the users' going out based on a result of comparison between the action information and the action patterns of the plurality of users.

Action patterns may be defined for a plurality of users. In such a case, the time of any of the plurality of users' going out can be estimated.

Any of the plurality of sensors may be a sensor capable of personal identification, and the controller may compare an action pattern of an identified user against the action information and estimates the time of going out for each user.

For example, a sensor capable of obtaining biometric information or an image sensor is capable of personal identification. In such a case, the time of a particular individual's going out can be estimated by generating the action information for each user.

The action pattern may be data associated with the time of a relevant user's going out.

The time of going out may be an absolute time or a relative time (such as a time that has elapsed since a point in time in the pattern).

The controller may calculate a deviation between the action pattern and an actual action of the user based on the result of comparison, and estimate the time of going out based on the deviation.

The action pattern rarely perfectly matches with the actual action. Therefore, by calculating the deviation, the time of going out can be corrected. The deviation may be a lag time at a point in time or a final lag time at the predicted time of going out.

The controller may further calculate a likelihood of the user's going out based on a degree of similarity between the action information and the action pattern.

By determining a numerical value that indicates to what extent the action pattern matches with the actual action, the likelihood (probability) of the user's going out can be calculated.

The controller may reserve a vehicle for the user based on the estimated time of going out.

For example, by reserving dispatch of an automatic driving vehicle in advance, the convenience of the user can be improved.

The controller may confirm an intention of the user to use the vehicle before a predetermined cancelation deadline comes.

Furthermore, the controller may further calculate a likelihood of the user's going out, and confirm the intention of the user to use the vehicle if the likelihood is lower than a threshold.

When dispatch of a vehicle is reserved, the intention of the user may be confirmed within a period in which the reservation can be cancelled. If the likelihood of going out is somewhat high (if the user is surely expected to go out), the confirmation of the intention may be omitted.

The controller may further estimate a destination of a going out based on information on a past movement obtained from a terminal associated with the user.

The controller may further estimate means of transportation based on information on a past movement obtained from a terminal associated with the user.

The terminal associated with the user may be a mobile terminal carried by the user when the user goes out, or an on-board terminal on the vehicle used by the user when the user goes out. The terminal can also be an apparatus that manages the vehicle.

The means of transportation is not limited to a vehicle but may be a route bus, a taxi, an on-demand bus, an automatic driving vehicle, a personal mobility, a bicycle or walk, for example.

The controller may determine a type of the vehicle to be reserved based on the destination.

The controller may determine a type of the vehicle to be reserved based on the means.

The vehicle to be reserved is not limited to an automatic driving automobile. For example, the vehicle may be a personal mobility or a shared taxi, for example. The controller can reserve an appropriate type of vehicle based on the destination of a past movement or the means used for a past movement.

In the following, embodiments of the present disclosure will be described. The configurations of the embodiments described below are given for illustrative purposes, and the present disclosure is not limited to the configurations of the embodiments.

First Embodiment

An overview of a vehicle dispatching system according to a first embodiment will be described with reference to FIG. 1. The vehicle dispatching system according to this embodiment includes an information processing apparatus 100 that has jurisdiction over a predetermined building associated with a user (such as a house of the user), a sensor group 200 including a plurality of sensors that sense the user in the building, and a vehicle dispatching server 400.

The information processing apparatus 100 according to the first embodiment is an apparatus installed in the house of the user and issues a request for dispatch of a vehicle to the vehicle dispatching server 400. The information processing apparatus 100 estimates a time of the user's going out based on information obtained from a plurality of sensors installed in the house, and issues a vehicle dispatch request for a vehicle 500 in such a manner that the vehicle 500 arrives at the house before the estimated time.

Although FIG. 1 illustrates the information processing apparatus 100 as being installed in the building, the information processing apparatus 100 may be installed at a remote location. Furthermore, one information processing apparatus 100 may have jurisdiction over a plurality of facilities (such as houses of a plurality of users).

The sensor group 200 includes a plurality of sensors installed in the house. The plurality of sensors can be any types of sensors, as far as the sensors can detect an action of the user in the house. For example, a sensor that detects where the user is in the house or a sensor that detects what the user is doing in the house can be used.

The vehicle dispatching server 400 is an apparatus that transmits a command to an automatic driving vehicle (referred to as a vehicle 500 hereinafter) based on the request from the information processing apparatus 100. In this embodiment, a plurality of vehicles 500 is under control of the vehicle dispatching server 400 and travels based on the command received from the vehicle dispatching server 400.

Although the house of the user is illustrated as the predetermined building in this embodiment, the building in which the information processing apparatus 100 and the sensor group 200 are installed is not limited to the house of the user but can be any facility.

Figure 2:
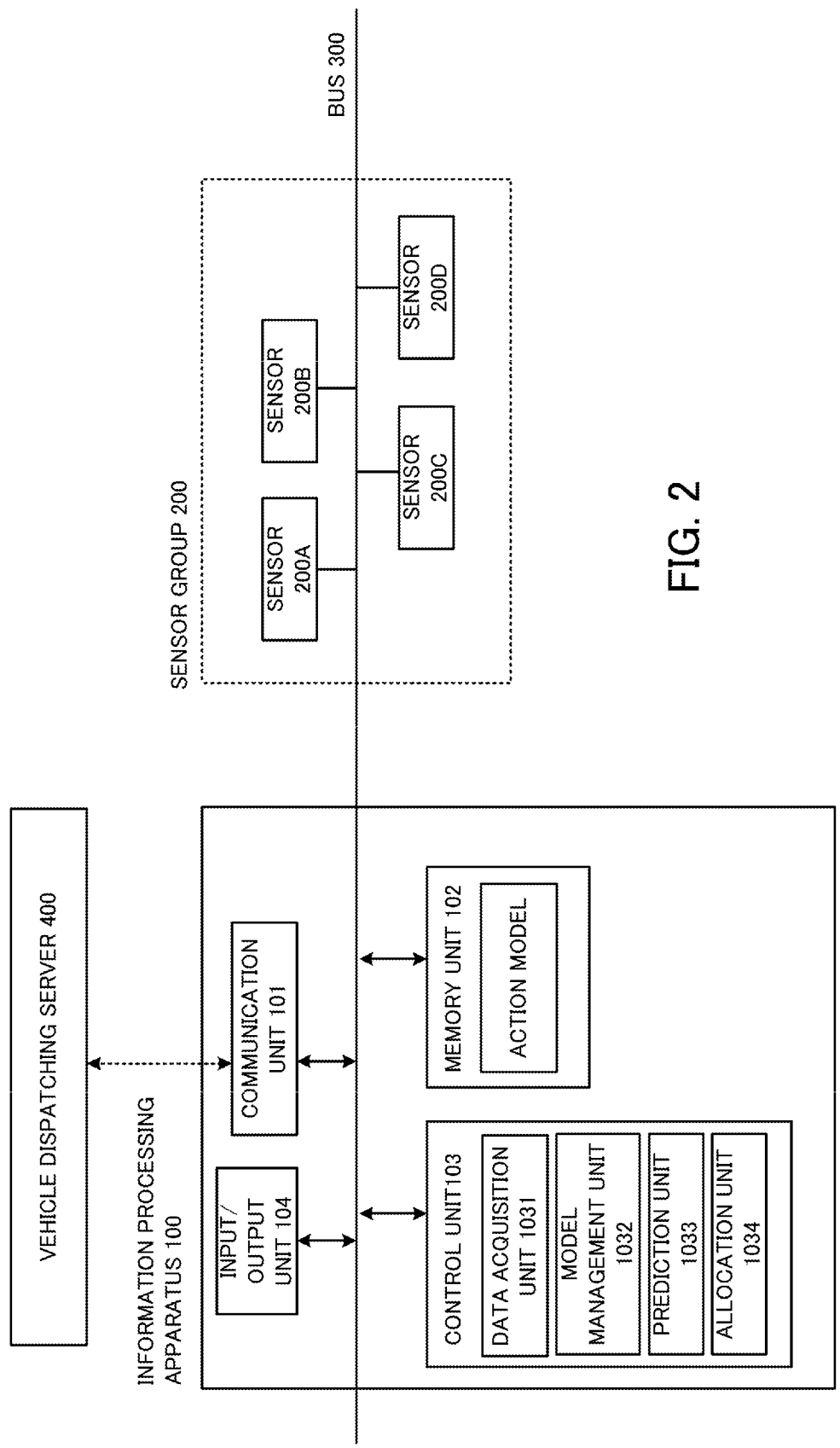
FIG. 2 is a diagram illustrating components of the vehicle dispatching system in more detail.

FIG. 2 is a diagram illustrating components of the vehicle dispatching system according to this embodiment in more detail. First, sensors in the sensor group 200 will be described.

Figure 3:
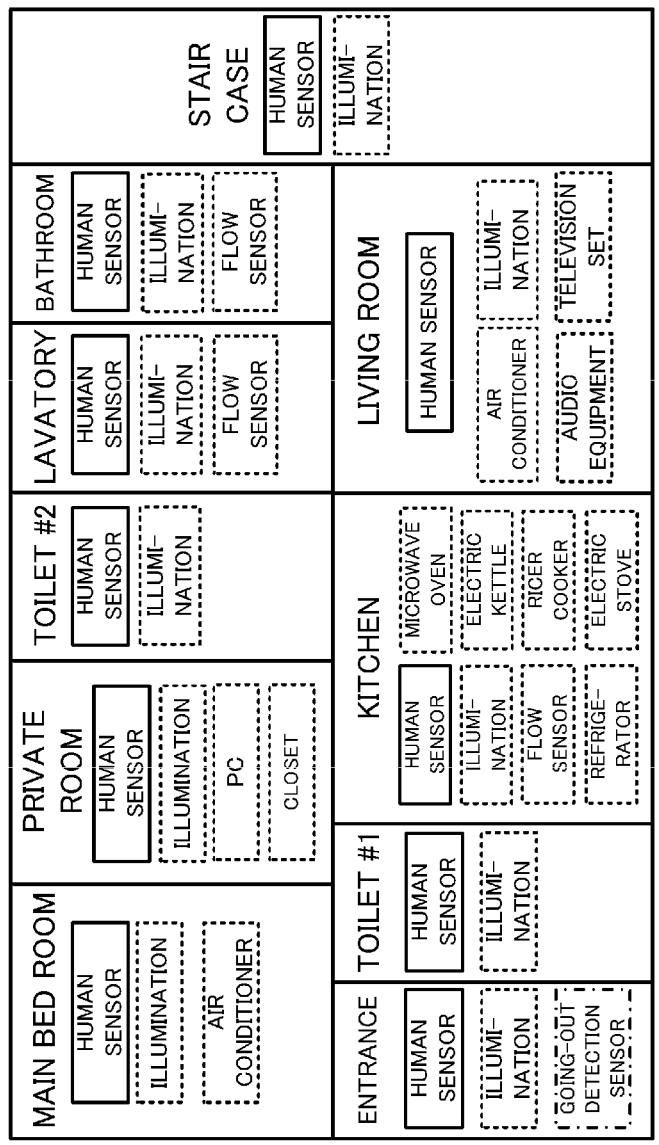
FIG. 3 is a diagram illustrating a plurality of sensors installed in a house.

FIG. 3 is a diagram illustrating a plurality of sensors installed in the house. As illustrated, in this embodiment, a plurality of sensors is installed in the house of the user. The sensors can be broadly divided into a human sensor installed in each room (illustrated by a solid line. Also known as a human detection sensor), a sensor associated with equipment installed in each room (illustrated by a dotted line and referred to as an equipment sensor hereinafter), and a sensor that detects the user going out of the house (illustrated by an alternate long and short dash line and referred to as a going-out detection sensor hereinafter).

By using the human sensor, where the user is in the house can be located. By using the equipment sensor, which equipment the user is using in the house can be specified. By using the going-out detection sensor, that the user has gone out of the house can be detected.

The human sensor is a sensor that detects the presence of a person. The human sensor may be an infrared sensor or may be a device that detects the presence of a person based on an image obtained by taking a picture of the inside of the building or a sound collected by a microphone.

The equipment sensor is a sensor that senses the utilization of equipment installed in the house. The equipment sensor may be incorporated in the equipment or may indirectly detect that the equipment is in use.

For example, a distance sensor incorporated in the equipment can detect that the user is in front of the equipment, or a sensor that detects an energization of the equipment can detect that the equipment is in use. Alternatively, software running on the equipment may detect that a particular manipulation is performed by the user.

What is sensed by the equipment sensor is not particularly limited. For example, a sensor incorporated in a television set may detect that the television set is on or that a particular television channel has been selected. As another example, a sensor incorporated in a rice cooker may detect that a cooking button is pressed or that the lid is opened or closed.

The going-out detection sensor is a unit configured to detect that the user has gone out of the house. For example, the detection of the going out can be achieved by a sensor provided on an entrance door. For example, it can be determined that the user has gone out, by checking whether the door is opened or closed and whether the door is locked or unlocked. The detection of the going out may be based on an image. For example, the going out can be detected with a camera installed in the entrance hall.

The going-out detection sensor does not have to be installed in the house. For example, positional information may be obtained from a mobile terminal of the user, and it may be determined that the user has gone out of the house when the mobile terminal has gone away from the house. The information processing apparatus 100 may be configured to be able to communicate with the mobile terminal.

Referring back to FIG. 2, the information processing apparatus 100 will be described again.

The information processing apparatus 100 stores a model (referred to as an action model hereinafter) representing a typical action performed by the user before going out. The information processing apparatus 100 compares information obtained from the sensor group 200 against the action model, estimates that the user will go out in the near future based on the result of the comparison, and allocates a vehicle 500.

The information processing apparatus 100 may be constituted by a general-purpose computer. Specifically, the information processing apparatus 100 is a computer having a processor, such as a CPU or GPU, a main memory, such as a RAM or a ROM, and an auxiliary memory, such as an EPROM, a hard disk drive or a removable medium. The removable medium may be an USB memory or a disk recording medium, such as a CD or a DVD. The auxiliary memory stores an operating system (OS), various programs, or various tables, and each of the various functions described later suitable for a predetermined purpose can be implemented by loading a program stored in the auxiliary memory into a working area of the main memory and executing the program to control each component or the like. However, some or all of the functions may be implemented by a hardware circuit, such as ASIC or FPGA.

A communication unit 101 is a communication interface that connects the information processing apparatus 100 to a network. The communication unit 101 includes a network interface board and a wireless communication circuit for wireless communication, for example.

A memory unit 102 includes the main memory and the auxiliary memory. The main memory is a memory in which a program to be executed by a control unit 103 or data to be used by the control program is deployed. The auxiliary memory is a memory that stores a program to be executed by the control unit 103 or data to be used by the control program.

The memory unit 102 further stores the action model. The action model is a model that represents a typical action pattern (referred to as a predetermined action pattern hereinafter) performed by the user before going out.

The action model is generated based on a history of actions performed by the user before going out. By comparing an actual action of the user against the predetermined action pattern represented by the action model, the probability of the user's going out can be determined.

The action model may be a model that further includes an association with the time of the user's going out. For example, the action model may represent that "the relevant user having started the predetermined action pattern tends to go out in N minutes".

The action model may be automatically generated based on a result of sensing of the user. When the action model is automatically generated, machine learning can be used.

The control unit 103 is a computing device that is responsible for the control performed by the information processing apparatus 100. The control unit 103 can be implemented by an arithmetic processing unit, such as a CPU.

The control unit 103 has four functional modules, specifically, a data acquisition unit 1031, a model management unit 1032, a prediction unit 1033, and an allocation unit 1034. Each of the functional modules may also be implemented by the CPU executing a stored program.

The data acquisition unit 1031 acquires sensor data from a sensor in the sensor group described later. The sensor data acquired may be a digital signal or an analog signal. The sensor data may also be image data or sound data.

The data acquisition unit 1031 may convert the acquired signal into a predetermined format. For example, the data acquisition unit 1031 may acquire image data or sound data, based on which the user is detected, and output data indicating the presence or absence of the user. The sensor data may be converted into a feature value used in the machine learning.

The model management unit 1032 generates and updates the action model of the user.

Figure 4A:
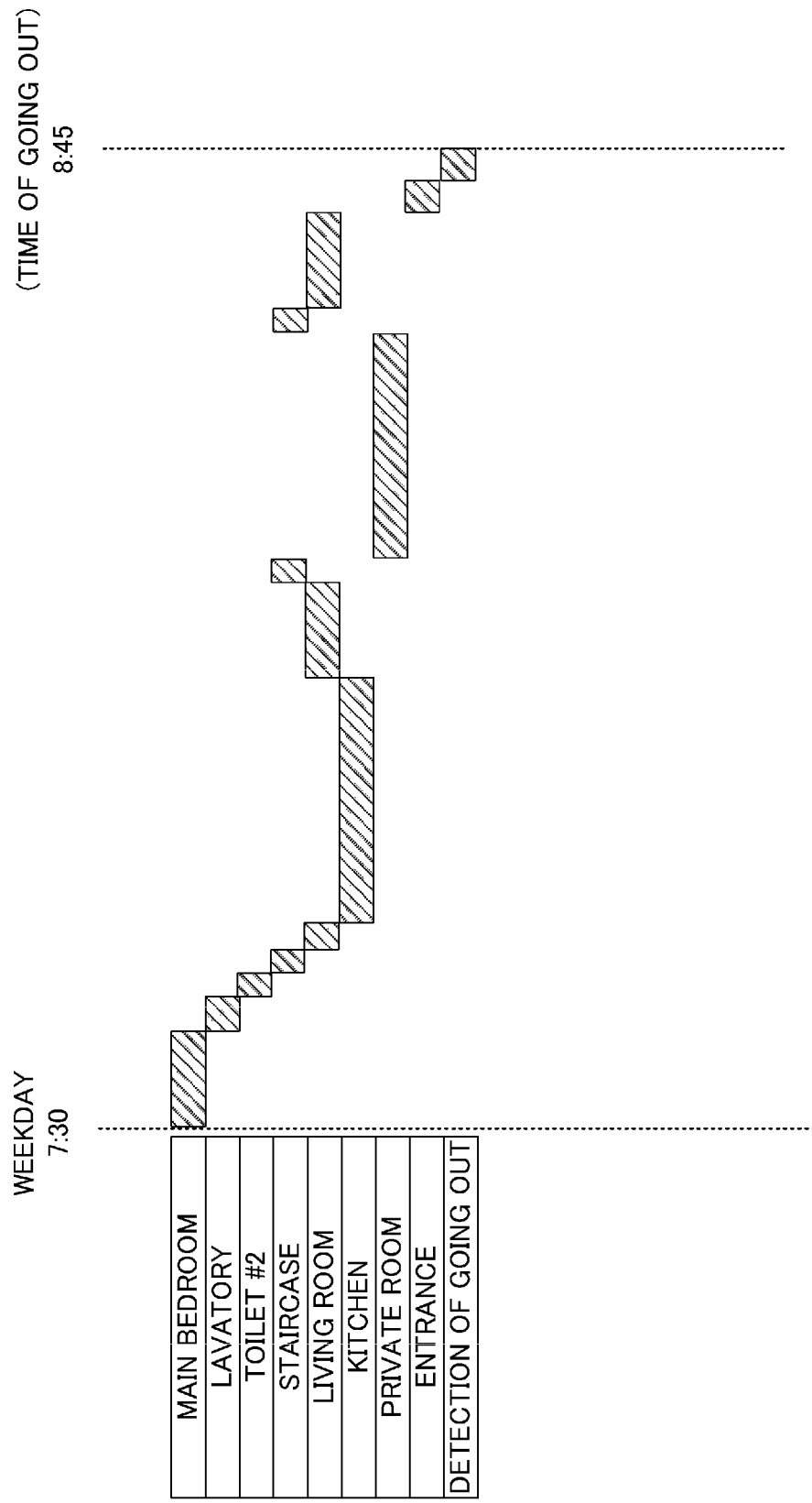
FIG. 4A illustrates an example in which a location of a user in the house is used as an indication of an action of the user.

Now, actions of the user will be described. FIG. 4A illustrates an example in which the location of the user in the house is used as an indication of an action of the user. In the illustrated example, the horizontal axis indicates the time, and the vertical axis indicates the location of the human sensor that has detected the user. That is, the actions of the user illustrated are the locations of the user in the house represented on a time-series basis.

In this example, as illustrated, the user gets up at 7:30 on a weekday, moves in the living room, the kitchen and a private room, and then goes out at 8:45.

Figure 4B:
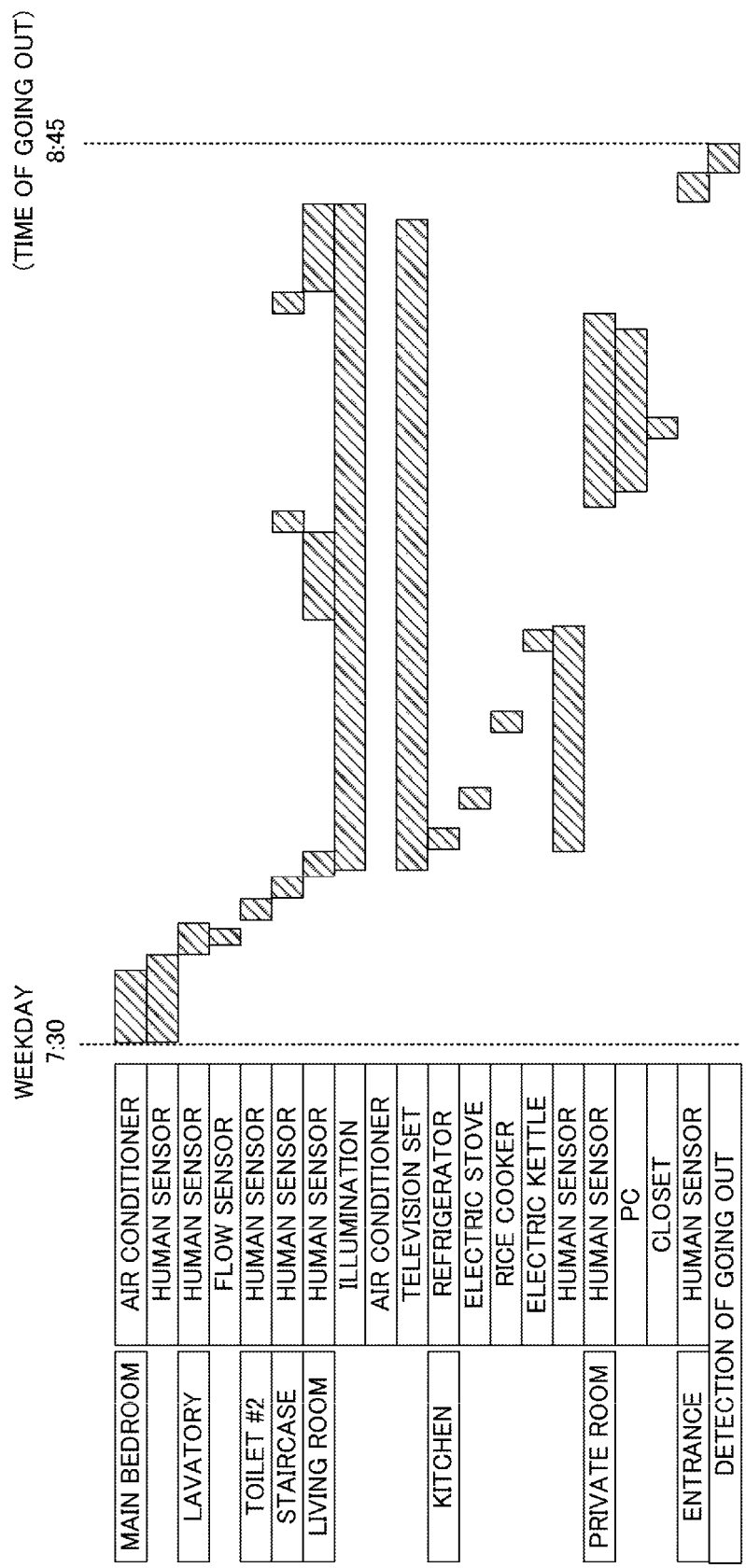
FIG. 4B illustrates an example in which information concerning equipment is used as an indication of an action of the user.

FIG. 4B illustrates an example in which information concerning equipment used in the house is used as an indication of an action of the user. In the example illustrated, an equipment sensor is illustrated in addition to human sensors. That is, the actions of the user illustrated are the locations of the user in the house and the utilization of equipment by the user represented on a time-series basis.

If the user performs similar actions before going out (such as before going to work every day), the time of going out must be able to be estimated by comparing an action pattern of the user obtained by the sensing against the predetermined action pattern represented by the action model. For example, if a certain level or higher of similarity is observed between the predetermined action pattern illustrated in FIG. 4A or 4B and the actual action pattern of the user, it can be estimated that the user will go out at the time of ending of the pattern. The action model stored in the information processing apparatus 100 is time-series data that represents such a typical action pattern performed by the user before going out.

Although the example illustrated indicates the presence of the user or the utilization of equipment in binary form, data of higher dimensions can also be used. For example, as data obtained from the human sensor, the number of sensings in a unit time may be used.

The model management unit 1032 generates or updates the action model based on the sensor data obtained from the sensor group 200.

The prediction unit 1033 predicts the time of the user's going out based on the stored action model and the sensor data obtained from the sensor group 200.

When the user is estimated to go out, the allocation unit 1034 generates a request for dispatch of a vehicle (referred to as a vehicle dispatch request) and transmits the request to the vehicle dispatching server 400.

An input/output unit 104 is an interface on which information is input and output. The input/output unit 104 is constituted by a display device or a touch panel, for example. The input/output unit 104 may include a keyboard, a near-field communication unit, or a touch screen, for example.

Next, a process performed by the control unit 103 will be described in more detail.

Figure 5:
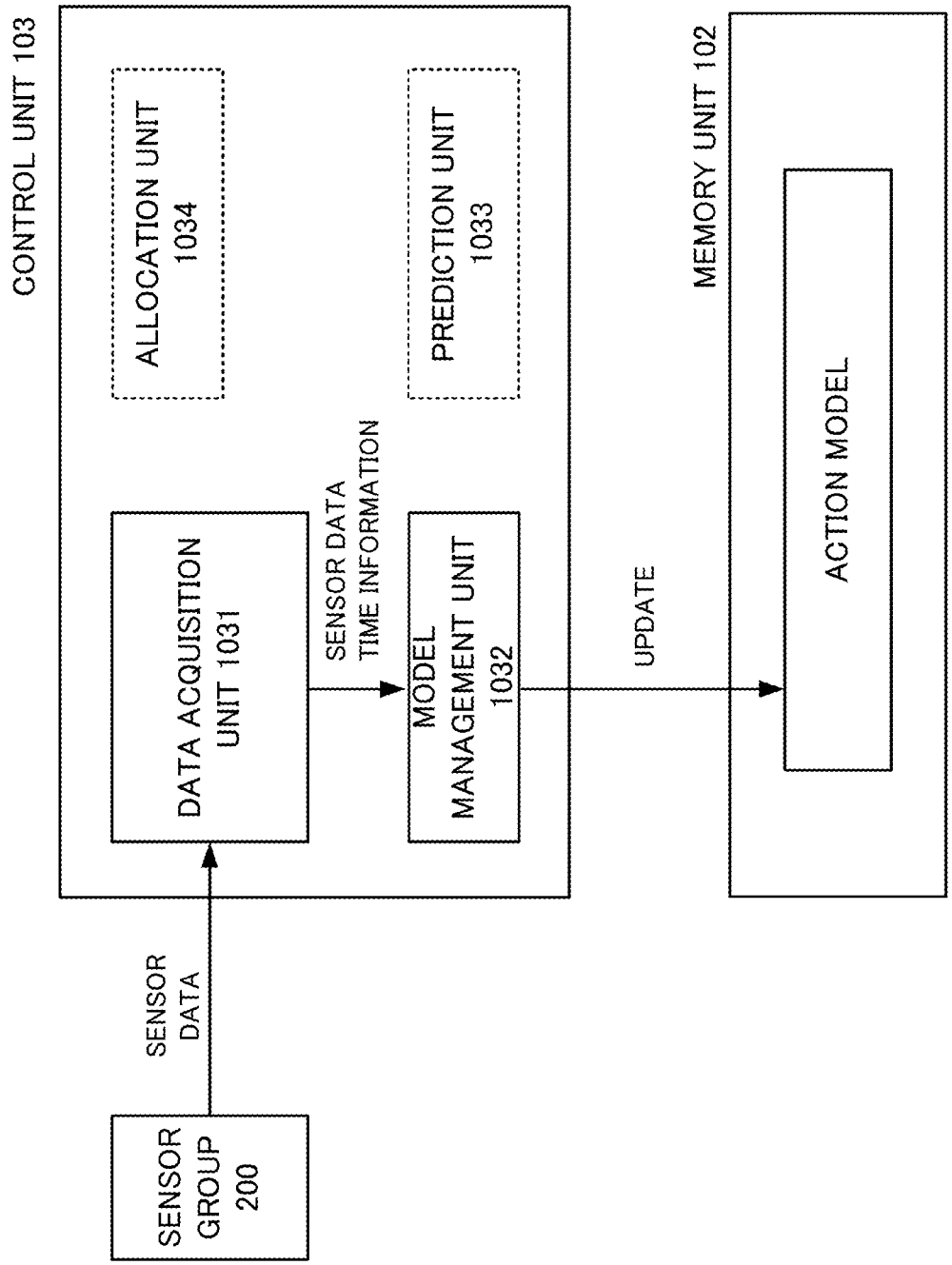
FIG. 5 is a diagram for illustrating a process of generating and updating an action model.

FIG. 5 is a diagram for illustrating of generating or updating the action model based on the actual actions performed by the user. The sensor group 200 constantly supplies sensor data output from each sensor to the data acquisition unit 1031. The data acquisition unit 1031 associates the obtained plurality of pieces of sensor data with time periodically (every one minute, for example), and sequentially transmits the sensor data to the model management unit 1032. The sensor data transmitted from the data acquisition unit 1031 is accumulated in the model management unit 1032.

The model management unit 1032 updates the action model in response to receiving sensor data indicating that the user has gone out from the data acquisition unit 1031.

Specifically, the accumulated plurality of pieces of sensor data is converted into data in time-series form (referred to as time-series data hereinafter). The time-series data may be sequence data that has sensor type and time as elements and contains values obtained by sensing, for example. The time-series data can be obtained by converting sensor data over a predetermined past period.

For example, if the user went out at 8:45 AM, the model management unit 1032 converts an hour of sensor data obtained from 7:45 AM to 8:45 AM into time-series data and updates the action model with the time-series data.

The action model may be a machine-learning model or a model that statistically represents a relationship between a plurality of actions performed in the house and the time of going out (or the remaining time before going out). Any type of action model is possible as far as the action model represents a predetermined action pattern of the user.

When the action model is a machine-learning model, the time-series data may be converted into a feature value, and the learning may be performed using the feature value as input data and the time of going out as training data.

The action model may be updated each time the user goes out, for example.

Figure 6:
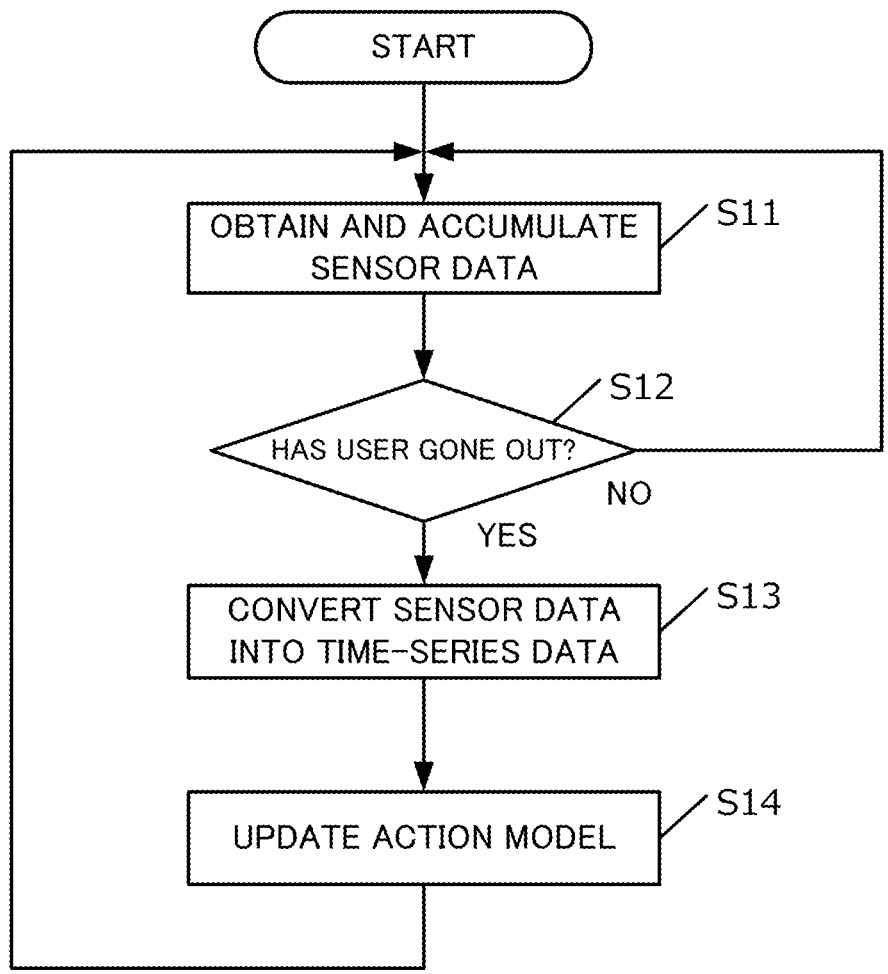
FIG. 6 is a flowchart illustrating a process performed by a model management unit.

FIG. 6 is a flowchart illustrating a process of the model management unit 1032 generating (or updating) an action model.

First, in Step S11, the model management unit 1032 sequentially accumulates sensor data transmitted from the data acquisition unit 1031. Each time sensor data is transmitted to the model management unit 1032, the model management unit 1032 determines whether or not the sensor data indicates that the user has gone out (Step S12). If the user has not gone out, the process returns to Step S11, and the model management unit 1032 continues accumulating sensor data.

If it is determined that the user has gone out, the process proceeds to Step S13, in which the model management unit 1032 converts the accumulated sensor data into time-series data. In this step, sensor data over a predetermined past period is converted into time-series data, for example. The model management unit 1032 then updates the action model with the obtained time-series data (Step S14).

Figure 7:
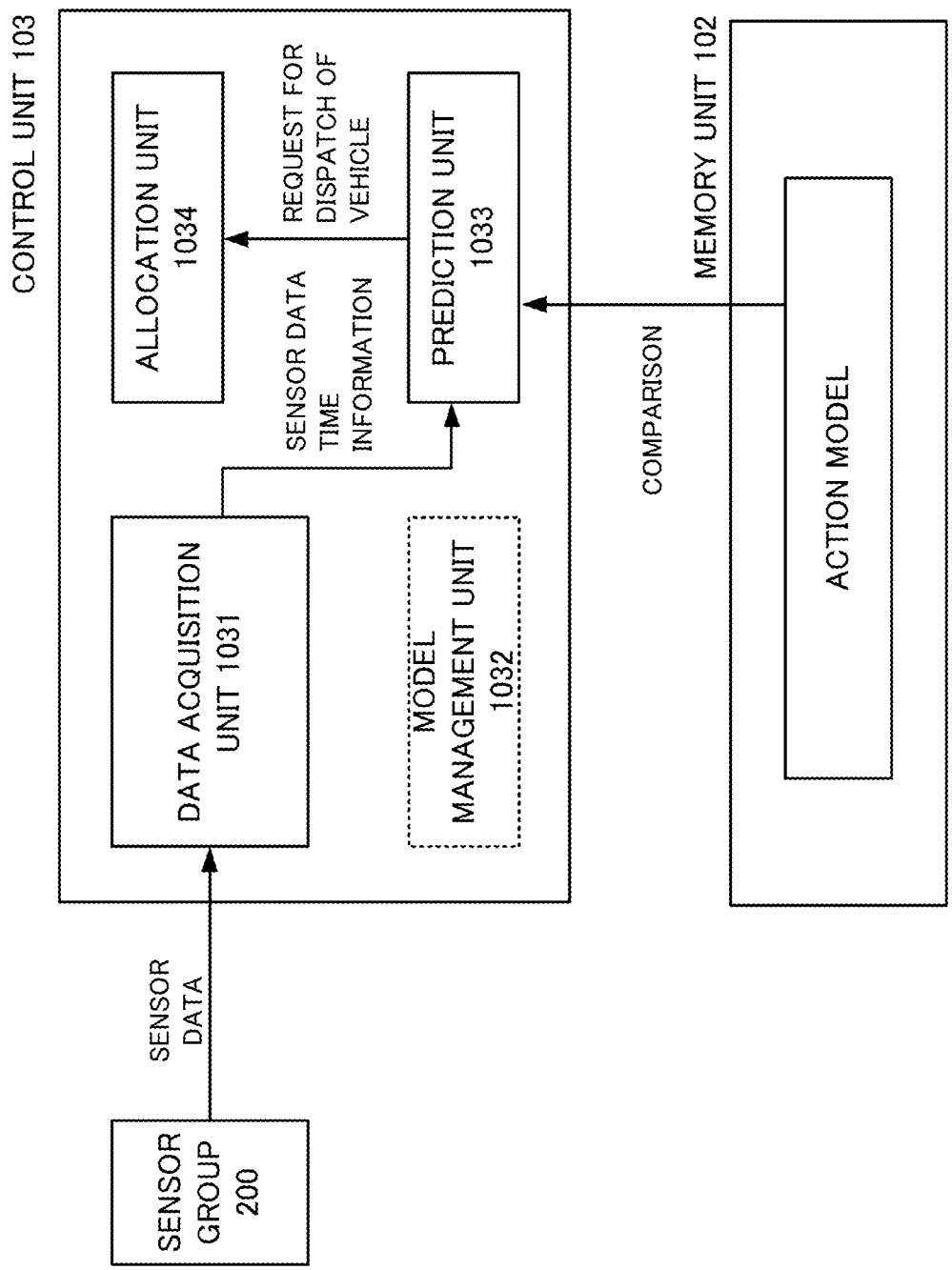
FIG. 7 is a diagram for illustrating a process of predicting a user's going out and dispatching a vehicle.

FIG. 7 is a diagram for illustrating a process of predicting that the user will go out and making a vehicle dispatch reservation using the stored action model. In this example, again, the sensor group 200 constantly supplies sensor data output from each sensor to the data acquisition unit 1031, and the data acquisition unit 1031 periodically sequentially supplies the obtained sensor data to the prediction unit 1033.

The prediction unit 1033 temporarily accumulates the data supplied from the data acquisition unit 1031, and makes a comparison of the action pattern between the accumulated data and the action model stored in the memory unit 102.

Specifically, the prediction unit 1033 converts the accumulated sensor data into time-series data each time a predetermined determination period has elapsed. The prediction unit 1033 compares the obtained time-series data against the predetermined action pattern represented by the action model, and calculates the degree of similarity between the action pattern indicated by the time-series data and the predetermined action pattern. The obtained degree of similarity provides a value that represents the likelihood (probability) of the user's going out.

When the action model is a machine-learning model, the time-series data may be converted into a feature value, and the evaluation may be performed using the feature value as input data.

If the result of the comparison indicates that the obtained degree of similarity is equal to or higher than a predetermined value, the prediction unit 1033 determines that "the user is behaving as indicated by the predetermined action pattern and will go out in the near future (or is exhibiting a sign of going out)". In this case, the prediction unit 1033 calculates the remaining time before the time of going out indicated by the action model, and generates and transmits a vehicle dispatch request via the allocation unit 1034 if the remaining time is less than a predetermined time.

Figure 8:
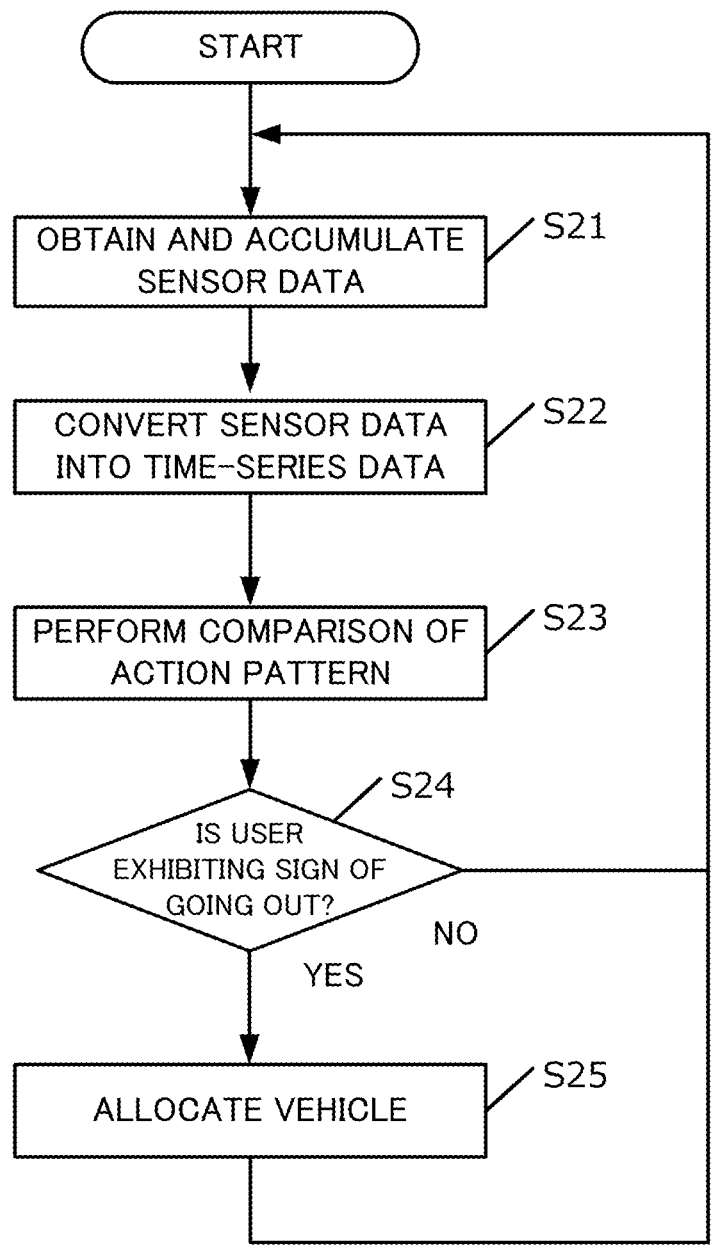
FIG. 8 is a flowchart illustrating a process performed by a prediction unit.

FIG. 8 is a flowchart illustrating a process of the prediction unit 1033 predicting the user's going out and making a vehicle dispatch reservation.

In Step S21, the prediction unit 1033 sequentially accumulates sensor data transmitted from the data acquisition unit 1031.

In Step S22, the prediction unit 1033 converts the accumulated sensor data into time-series data. The prediction unit 1033 then makes a comparison of the action pattern between the obtained time-series data and the stored action model, and calculates the degree of similarity (Step S23). The prediction unit 1033 then determines whether or not the user is exhibiting a sign of going out based on the obtained degree of similarity (Step S24).

If the obtained degree of similarity is lower than a predetermined threshold, the process returns to Step S11, and the prediction unit 1033 continues accumulating sensor data.

If the degree of similarity is higher than the predetermined threshold, the process proceeds to Step S25, in which the prediction unit 1033 issues a request for a vehicle for the user. The vehicle dispatch request may include a dispatch destination or a desired time of arrival (that is, the time of the user's going out).

When the actual time of going out turns out after the time of going out is estimated, the process of updating the action model may be performed using the actual time of going out.

As described above, the information processing apparatus 100 according to the first embodiment produces information on the actions of the user based on information from the plurality of sensors installed in the building and estimates whether the user is going out or not by comparing the information against the action pattern generated in advance. If it is determined that the user is going out, the information processing apparatus 100 allocates a vehicle to the user. With such a configuration, a vehicle can be called without the need of schedule information on the user, and the convenience of the user is improved.

First Modification of First Embodiment

Although the presence of a sign of going out is determined for a single user in the first embodiment, there may be a plurality of users in the building. Even when there is a plurality of users in the building, the sensor data obtained from the sensor group 200 can be checked against the action model.

By determining the presence of a sign using the action models representing the actions of a plurality of users, it is possible to estimate which of the plurality of users is going out.

Second Modification of First Embodiment

Although a single action model is illustrated in the first embodiment, a plurality of action models for one user may be stored. For example, a plurality of action models, such as a "weekday action model, a "weekend action model", or an "action model for the case of going to work afternoon", can be stored, and the time of going out can be estimated using the plurality of action models.

In this case, instead of comparing the degree of similarity of the action pattern against a fixed threshold, it can also be determined "which pattern is the closest to the actions of the user".

Furthermore, action models can be provided on the basis of the attribute of a day. For example, action models may be defined on a day of the week basis or on a weekday or weekend basis, and an action model appropriate to the day for which the time of going out is to be predicted can be selected.

Third Modification of First Embodiment

Although the action model is associated with the time of going out in the first embodiment, the action model may be used only to determine the action pattern of the user, and the time of going out may be derived from another data source. For example, if it is determined that an action of the user matches with an action pattern "going to work", the information processing apparatus 100 can acquire a movement history of the user when the user is going to work, and thereby estimate the time of departure.

Fourth Modification of First Embodiment

Furthermore, an additional processing may be performed depending on the degree of similarity of the action pattern.

For example, if the degree of similarity is lower than a predetermined value, it means that the probability of going out at the estimated time is low. In such a case, if dispatch of a vehicle is automatically requested, a problem can occur, so that a processing of interacting with the user to raise the estimation precision may be performed. For example, the information processing apparatus 100 can ask the user whether to request for dispatch of a vehicle via a user terminal and obtain the answer. Such a processing may be performed before the deadline for cancellation of the dispatch of the vehicle comes.

Fifth Modification of First Embodiment

Figure 9A:
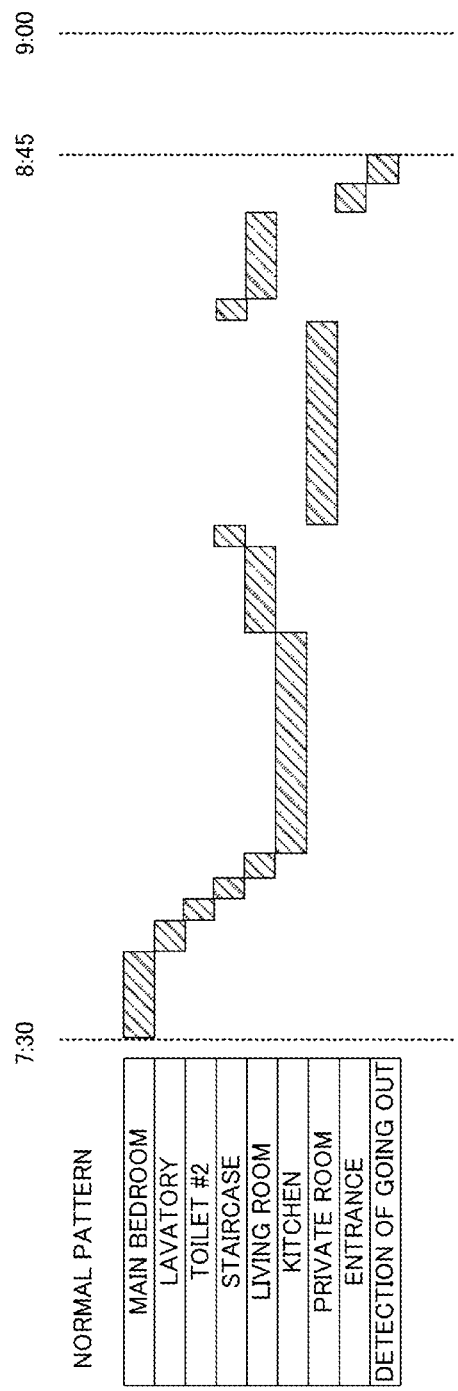
FIG. 9A is a diagram for illustrating a fluctuation of an action pattern.
Figure 9B:
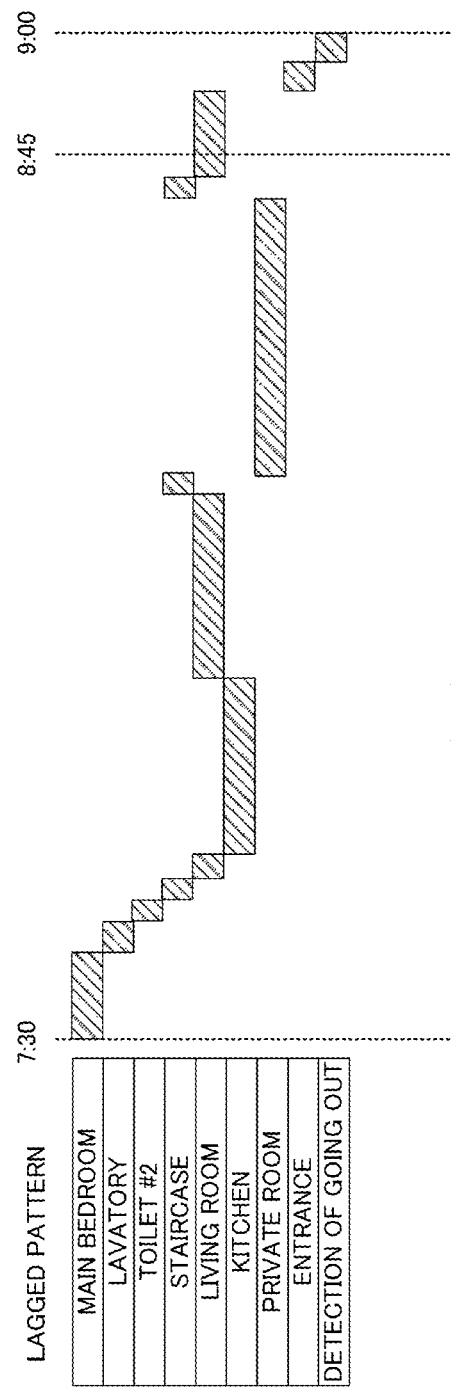
FIG. 9B is a diagram for illustrating a fluctuation of an action pattern.

In the first embodiment, the time of going out is estimated based on the time-series data and the action model stored in advance. However, one does not act at the same rate every day. For example, as illustrated in FIG. 9, even if the order of actions from getting up to going out is the same every day, each action may take a different length of time every day.

To address the problem, a lag from the predetermined action pattern may be calculated. For example, if it is detected that each action takes longer even though the order of actions is not significantly changed, the comparison can be continued on the supposition that a lag time has occurred. Furthermore, it can also be determined that the time of going will be delayed by the lag time.

Second Embodiment

A second embodiment is an embodiment in which the memory unit 102 stores action models for a plurality of people, and whether to go out is estimated for each of a plurality of users in a building.

Figure 10A:
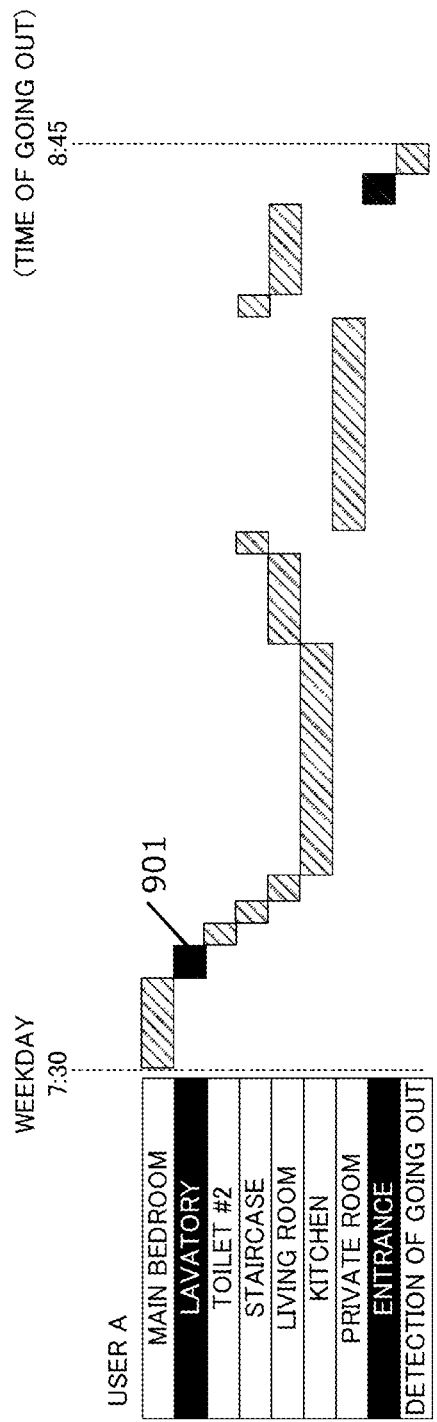
FIG. 10A is a diagram illustrating an action model of one of a plurality of people.
Figure 10B:
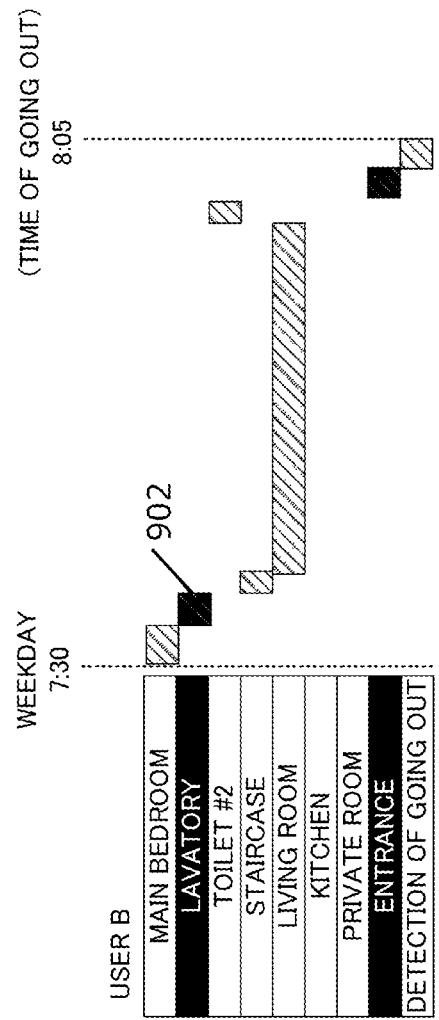
FIG. 10B is a diagram illustrating an action model of another of a plurality of people.

FIG. 10 are diagrams illustrating predetermined action patterns of a plurality of people. In this example, actions of two people, specifically a user A and a user B, from getting up to going out on a weekday are illustrated.

As described above, even if there is a plurality of users in the building, the sensor data can be checked against the action model. However, if only sensor data transmitted from a sensor that is not capable of personal identification is used, it cannot be identified who is going out.

Figure 11:
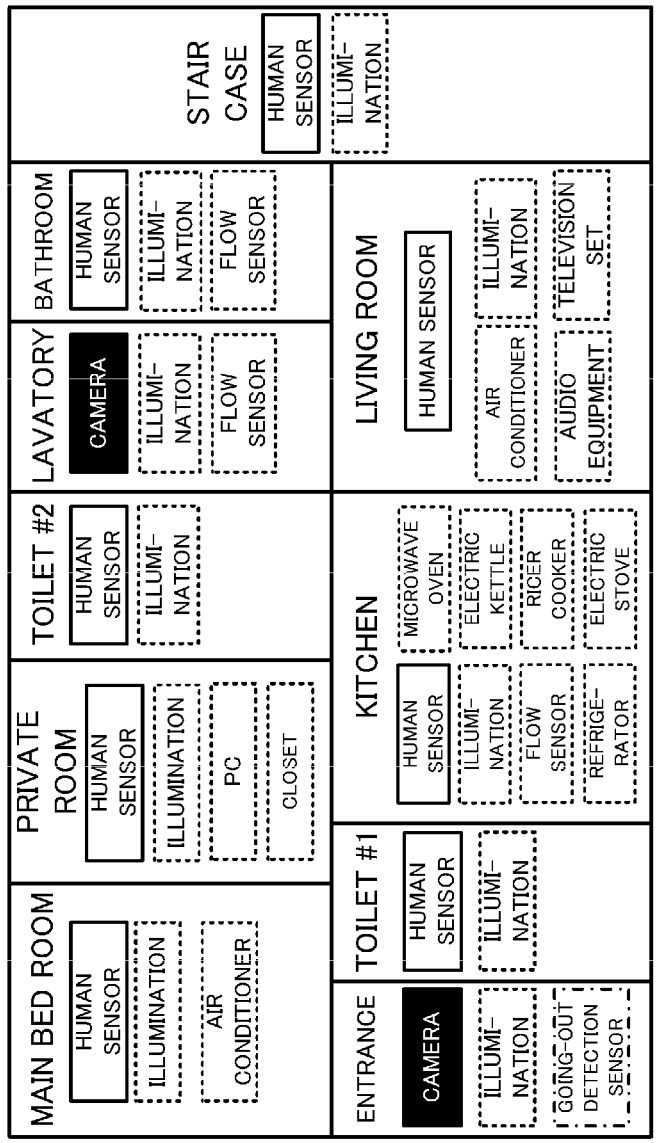
FIG. 11 is a diagram for illustrating a sensor group according to a second embodiment.

To address the problem, in the second embodiment, the sensor group 200 includes at least one sensor capable of personal identification. FIG. 11 is a diagram for illustrating the sensor group 200 according to the second embodiment. For example, in the example illustrated, a camera is installed in the entrance and the lavatory, and an individual can be identified based on a captured image of a face. In this embodiment, the data acquisition unit 1031 receives data from the camera, identifies an individual, and generates an identifier of a user (referred to as a user identifier hereinafter). The generated user identifier is transmitted to the prediction unit 1033 as with the sensor data.

Any sensor capable of personal identification other than the camera can be used. For example, the iris recognition, the speech recognition or other recognitions based on other biometric information (such as weight) can be used.

Furthermore, the prediction unit 1033 identifies a user to be tracked based on the user identifier, and performs the comparison of the action pattern using the action model for the identified user.

Figure 12:
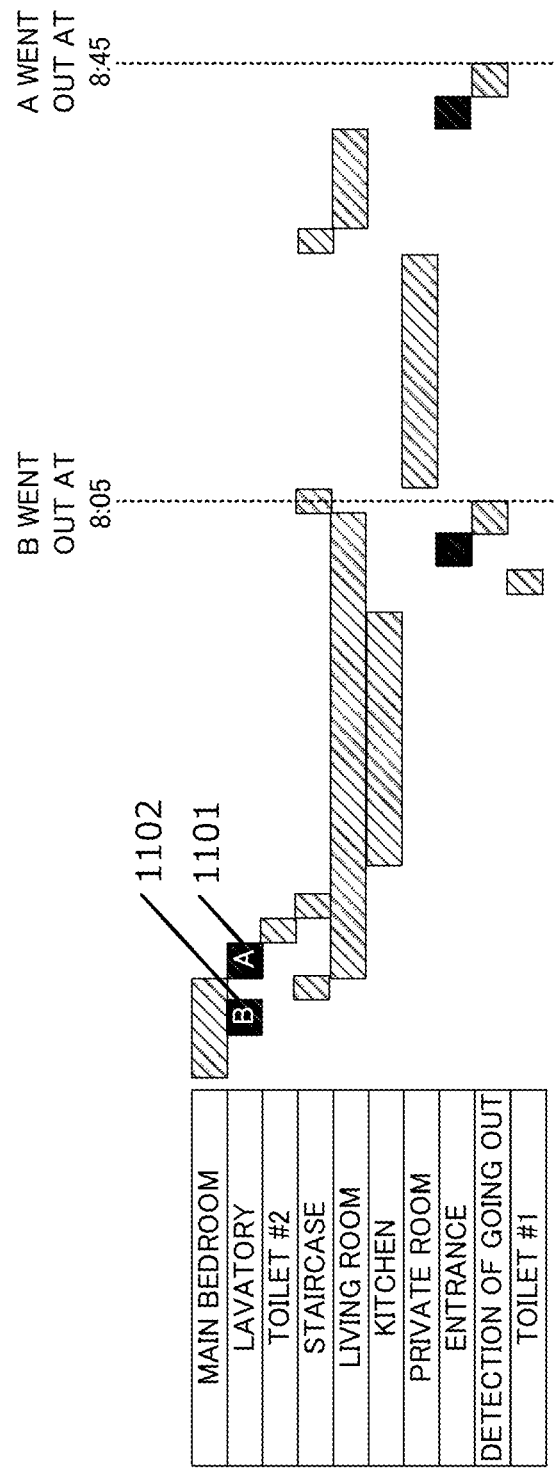
FIG. 12 illustrates an example of time-series data obtained by sensing users in a building.

FIG. 12 illustrates an example of the time-series data obtained by sensing users in the building. The data reflects both the actions of the user A and the actions of the user B, and therefore the data alone is insufficient to separately track each user. However, the users can be personally identified when the users are in the lavatory and in the entrance hall, so that the matching of the action pattern can be performed using these times as a clue.

For example, when comparing the predetermined action pattern of the user A illustrated in FIG. 10(A) against the time-series data illustrated in FIG. 12, a time denoted by reference numeral 901 is aligned with a time denoted by reference numeral 1101. That is, whether the time-series data indicates the predetermined action pattern of the user A is determined with reference to the time when the user A is detected in the lavatory. If the time-series data indicates the predetermined action pattern of the user A, it shows that the likelihood of the user A's going out is high. The same holds true for the user B.

Figure 13:
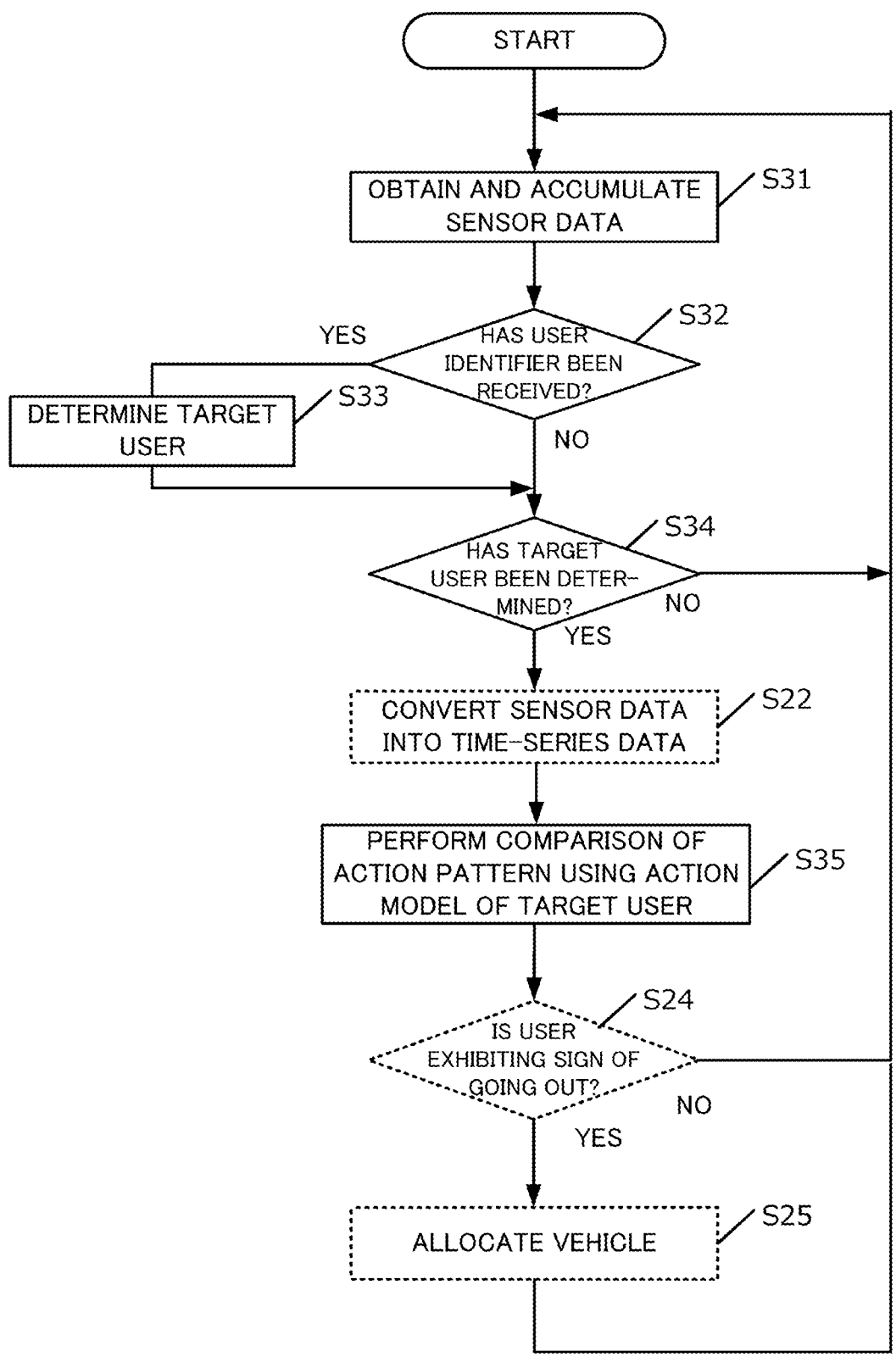
FIG. 13 is a flowchart illustrating a process performed by the prediction unit according to the second embodiment.

FIG. 13 is a flowchart illustrating a process performed by the prediction unit 1033 in the second embodiment. The steps indicated by dotted lines are the same as the steps in the first embodiment and therefore will not be further described.

In Step S31, as in the first embodiment, the prediction unit 1033 receives and accumulates sensor data. However, the second embodiment differs from the first embodiment in that a user identifier may be transmitted instead of sensor data. For example, if user identification has been performed based on an image taken by a camera, the prediction unit 1033 receives a user identifier instead of sensor data.

In Step S32, the prediction unit 1033 determined whether or not the prediction unit 1033 has received a user identifier. If the prediction unit 1033 has received a user identifier, the prediction unit 1033 determines the identified user to be the target of the matching in Step S33.

In Step S34, the prediction unit 1033 determined whether or not the user who is the target of the matching has been determined. If the result of the determination is negative, the process returns to Step S31.

In Step S35, the prediction unit 1033 obtains the action model for the user who has been determined to be the target of the matching and performs the comparison of the action patterns with the action model. In this step, the action patterns are aligned with respect to the time when the user is identified. For example, if the user A is the target, the time denoted by reference numeral 901 and the time denoted by reference numeral 1101 are aligned. If the user B is the target, a time denoted by reference numeral 902 and a time denoted by reference numeral 1102 are aligned. In this way, the degree of similarity of the action pattern can be obtained for each user. The processings in Step S24 and the following steps are the same as those in the first embodiment.

According to the second embodiment, even when there is a plurality of users in the building, the time of going out can be estimated for each user.

Third Embodiment

A third embodiment is an embodiment in which means of transportation and the destination of a user when the user went out in the past are recorded, and a more preferable vehicle is dispatched based on the recorded data.

Figure 14:
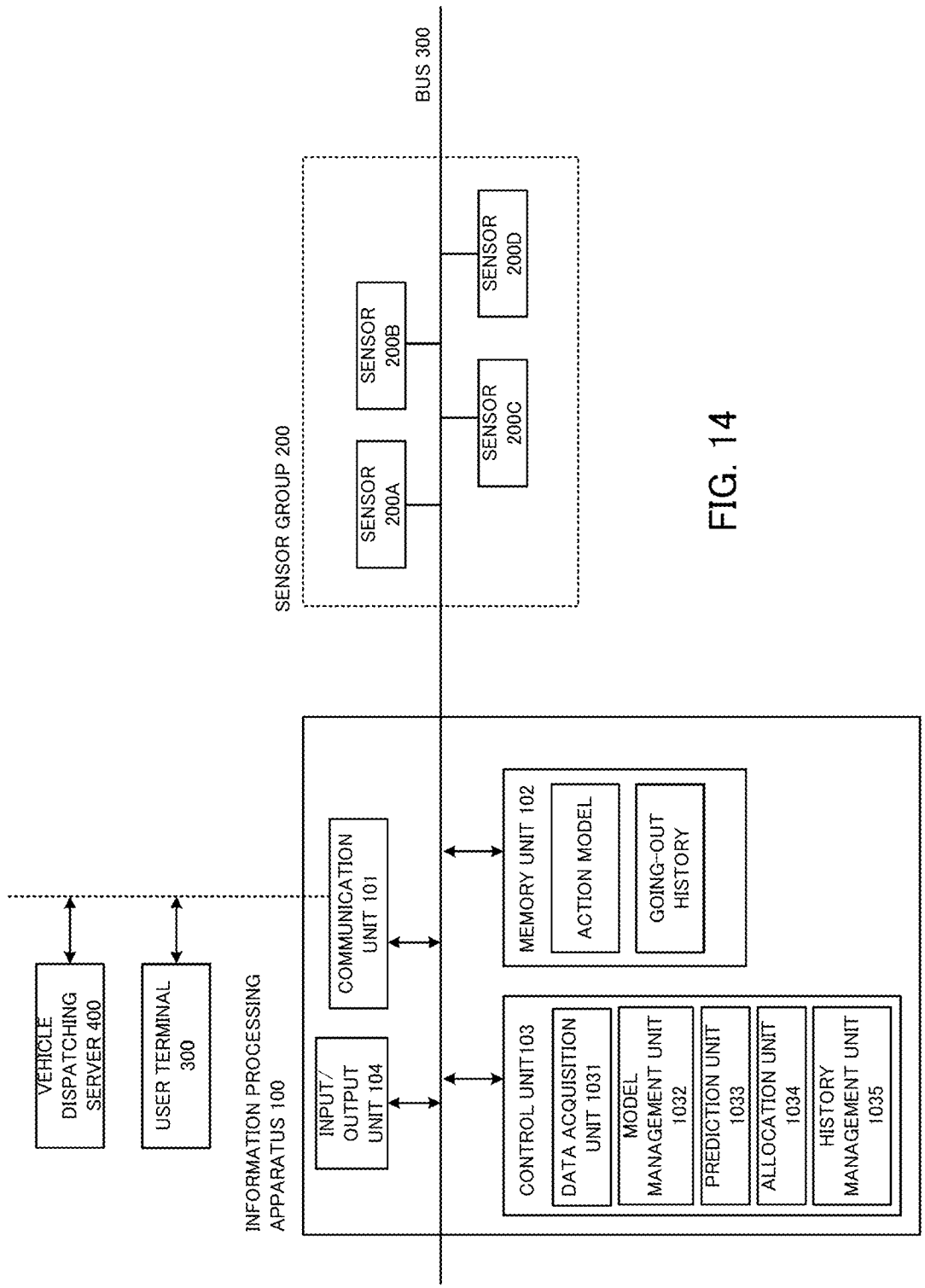
FIG. 14 is a diagram illustrating components of a vehicle dispatching system according to a third embodiment in more detail.

FIG. 14 is a diagram illustrating components of a vehicle dispatching system according to the third embodiment in more detail. In the third embodiment, the information processing apparatus 100 communicates with a terminal of a user (user terminal 300) and can obtain an action history while the user is away from the building.

In this embodiment, the control unit 103 has a history management unit 1035.

The history management unit 1035 periodically communicates with the user terminal 300 associated with the user and obtains positional information. The obtained positional information is stored in the memory unit 102 as a going-out history.

FIG. 15 illustrates an example of the going-out history. The going-out history includes an identifier of the action pattern performed by the user before going out, the destination of the user going out, and the route of movement while the user is away from the building associated with each other, for example. In this way, it can be determined that "when the action pattern before going out is P1, the user is likely to go to the destination X1". The going-out history may include a location at which the user stopped, the length of stay at the location, or the purpose of the movement, for example. When the means of transportation used by the user can be identified, associated information can also be additionally stored. The means of transportation used may be estimated based on a vehicle reservation request issued from the user terminal 300 or the speed of the movement while the user is away from the building, for example.

Furthermore, in Step S26, the prediction unit 1033 selects a vehicle type based on the stored going-out history. The vehicle type can be selected based on the destination or the route of movement. For example, based on the distance to the destination, a vehicle having an appropriate cruising distance can be selected. For example, a personal mobility can be selected when the user is going shopping in the neighborhood, and an automobile can be selected when the user is going to work. Alternatively, based on the purpose of the going out, a vehicle having an appropriate riding capacity or load capacity can be selected. For example, when it is estimated that a plurality of people will go out, a vehicle that can accommodate all the people can be selected.

According to the third embodiment, an appropriate type of vehicle can be allocated.

Although the history management unit 1035 has been described as communicating with the user terminal 300 in this example, the history management unit 1035 can also obtain information from an apparatus that manages the utilization history of a mobility.

Modifications

The embodiments described above are just examples, and various modifications are possible without departing from the spirit of the present disclosure.

For example, the processings and units described in the present disclosure can be used in any combination as far as no technical contradiction occurs.

Furthermore, a processing described as being performed by one device may be performed in cooperation of a plurality of devices. Alternatively, processings described as being performed by different devices may be performed by one device. In the computer system, the hardware component (server component) that provides each function can be flexibly changed.

The present disclosure can also be implemented by installing a computer program that implements the functions described above with regard to the embodiments in a computer and by one or more processors of the computer reading and executing the program. Such a computer program may be provided to the computer via a non-temporary computer readable memory medium that can be connected to a system bus of the computer, or may be provided to the computer via a network. The non-temporary computer readable memory medium may be any type of disk such as a magnetic disk (such as a floppy (registered trademark) disk or a hard disk drive (HDD)) or an optical disk (such as a CD-ROM, a DVD disk or a Blu-ray disk), or any type of medium suitable for storage of an electronic instruction, such as a read only memory (ROM), a random access memory (RAM), an EPROM, an EEPROM, a magnetic card, a flash memory or an optical card.

What is claimed is:

1. An information processing apparatus, comprising:
a storage; and
a controller configured to:
receive human sensor data transmitted from a human sensor installed in each room of a building and equipment sensor data transmitted from an equipment sensor associated with an equipment installed in each room of the building, the human sensor detecting a presence of a human and the equipment sensor sensing a utilization of the equipment, the human sensor data indicating a location of a user in the building and the equipment sensor data indicating the utilization of the equipment;
associate each of the human sensor data and the equipment sensor data with time;
accumulate, in the storage, the human sensor data associated with time and the equipment sensor data associated with time;
receive going-out detection sensor data transmitted from a going-out detection sensor that detects the user going-out of the building, the going-out detection sensor data indicating that the user has gone out;
in response to receiving the going-out detection sensor data, convert the human sensor data associated with time and the equipment sensor data associated with time over a first period until time when the going-out detection sensor data has been received into first time-series data over the first period until the time when the going-out detection sensor data has been received, the first time-series data indicating the location of the user in the building and the utilization of one or more pieces of the equipment on a time-series basis;
store, in the storage, the first time-series data as data that represents a typical action pattern performed by the user before going out;
after the data that represents the typical action pattern has stored in the storage, generate second time-series data as action information on the user in the building every time when a second period has elapsed by converting the human sensor data associated with time and the equipment sensor data associated with time over the second period into the second time-series data over the second period, the second time-series data indicating the location of the user in the building and the utilization of one or more pieces of the equipment on a time-series basis;
calculate a likelihood of the user's going out based on a degree of similarity between the action information and the typical action pattern by making a comparison between the action information and the typical action pattern;
determine whether or not the likelihood is equal to or higher than a threshold;
when the likelihood is equal to or higher than the threshold, estimate a time of the user's going out by calculating remaining time before the time when the going-out detection sensor data has been received, the time indicated by the typical action pattern, based on the generated action information;

generate a request for dispatch of a vehicle, the request including the estimated time of the user's going out and a location of the building as a dispatch destination; and transmit the request to a vehicle dispatching server which controls a plurality of automatic driving vehicles and transmits, to an automatic driving vehicle for the user of the plurality of automatic driving vehicles, a command to travel in such a manner that the automatic driving vehicle for the user arrives at the building before the estimated time of the user's going out based on the request.

2. The information processing apparatus according to claim 1,
wherein the controller stores, in the storage, the first time-series data over the first period until the time when the going-out detection sensor data has been received of each of a plurality of users as data that represents a typical action pattern performed by each of the plurality of users before going out, estimates the time of any of the users' going out based on a result of comparison between the action information and the typical action patterns of the plurality of users.

3. The information processing apparatus according to claim 2, wherein
any of a plurality of human sensors installed in the building is a sensor capable of personal identification, and
the controller compares a typical action pattern of an identified user against the action information and estimates the time of going out for each user.

4. The information processing apparatus according to claim 1, wherein
the controller calculates a deviation between the typical action pattern and an actual action of the user based on a result of the comparison, and estimates the time of going out based on the deviation.

5. The information processing apparatus according to claim 1, wherein
the controller confirms an intention of the user to use the automatic driving vehicle before a predetermined cancelation deadline comes.

6. The information processing apparatus according to claim 5, wherein
the controller confirms the intention of the user to use the automatic driving vehicle when the likelihood is lower than the threshold.

7. The information processing apparatus according to claim 1, wherein
the controller further estimates a destination of a going out based on information on a past movement obtained from a terminal associated with the user.

8. The information processing apparatus according to claim 7, wherein
the controller determines a type of the automatic driving vehicle for the user based on the destination.

9. The information processing apparatus according to claim 1, wherein
the controller further estimates means of transportation based on information on a past movement obtained from a terminal associated with the user.

10. The information processing apparatus according to claim 9, wherein
the controller determines a type of the automatic driving vehicle for the user based on the means.

11. An information processing method, comprising:
receiving human sensor data transmitted from a human sensor installed in each room of a building and equipment sensor data transmitted from an equipment sensor associated with an equipment installed in each room of the building, the human sensor detecting a presence of a human and the equipment sensor sensing a utilization of the equipment, the human sensor data indicating a location of a user in the building and the equipment sensor data indicating the utilization of the equipment;
associating each of the human sensor data and the equipment sensor data with time;
accumulating, in a storage, the human sensor data associated with time and the equipment sensor data associated with time;
receiving going-out detection sensor data transmitted from a going-out detection sensor that detects the user going-out of the building, the going-out detection sensor data indicating that the user has gone out;
in response to receiving the going-out detection sensor data, converting the human sensor data associated with time and the equipment sensor data associated with time over a first period until time when the going-out detection sensor data has been received into first time-series data over the first period until the time when the going-out detection sensor data has been received, the first time-series data indicating the location of the user in the building and the utilization of one or more pieces of the equipment on a time-series basis;
storing, in the storage, the first time-series data as data that represents a typical action pattern performed by the user before going out;
after the data that represents the typical action pattern has stored in the storage, generating second time-series data as action information on the user in the building every time when a second period has elapsed by converting the human sensor data associated with time and the equipment sensor data associated with time over the second period into the second time-series data over the second period, the second time-series data indicating the location of the user in the building and the utilization of one or more pieces of the equipment on a time-series basis;
calculating a likelihood of the user's going out based on a degree of similarity between the action information and the typical action pattern by making a comparison between the action information and the typical action pattern;
determining whether or not the likelihood is equal to or higher than a threshold;
when the likelihood is equal to or higher than the threshold, estimating a time of the user's going out by calculating remaining time before the time when the going-out detection sensor data has been received, the time indicated by the typical action pattern, based on the generated action information;
generating a request for dispatch of a vehicle, the request including the estimated time of the user's going out and a location of the building as a dispatch destination; and
transmitting the request to a vehicle dispatching server which controls a plurality of automatic driving vehicles and transmits, to an automatic driving vehicle for the user of the plurality of automatic driving vehicles, a command to travel in such a manner that the automatic driving vehicle for the user arrives at the building before the estimated time of the user's going out based on the request.

12. A non-transitory computer readable storing medium recording a computer program for causing a computer to perform an information processing method comprising:

receiving human sensor data transmitted from a human sensor installed in each room of a building and equipment sensor data transmitted from an equipment sensor associated with an equipment installed in each room of the building, the human sensor detecting a presence of a human and the equipment sensor sensing a utilization of the equipment, the human sensor data indicating a location of a user in the building and the equipment sensor data indicating the utilization of the equipment;

associating each of the human sensor data and the equipment sensor data with time;

accumulating, in a storage, the human sensor data associated with time and the equipment sensor data associated with time;

receiving going-out detection sensor data transmitted from a going-out detection sensor that detects the user going-out of the building, the going-out detection sensor data indicating that the user has gone out;

in response to receiving the going-out detection sensor data, converting the human sensor data associated with time and the equipment sensor data associated with time over a first period until time when the going-out detection sensor data has been received into first time-series data over the first period until the time when the going-out detection sensor data has been received, the first time-series data indicating the location of the user in the building and the utilization of one or more pieces of the equipment on a time-series basis;

storing, in the storage, the first time-series data as data that represents a typical action pattern performed by the user before going out;

after the data that represents the typical action pattern has stored in the storage, generating second time-series data as action information on the user in the building every time when a second period has elapsed by converting the human sensor data associated with time and the equipment sensor data associated with time over the second period into the second time-series data over the second period, the second time-series data indicating the location of the user in the building and the utilization of one or more pieces of the equipment on a time-series basis;

calculating a likelihood of the user's going out based on a degree of similarity between the action information and the typical action pattern by making a comparison between the action information and the typical action pattern;

determining whether or not the likelihood is equal to or higher than a threshold;

when the likelihood is equal to or higher than the threshold, estimating a time of the user's going out by calculating remaining time before the time when the going-out detection sensor data has been received, the time indicated by the typical action pattern, based on the generated action information;

generating a request for dispatch of a vehicle, the request including the estimated time of the user's going out and a location of the building as a dispatch destination; and transmitting the request to a vehicle dispatching server which controls a plurality of automatic driving vehicles and transmits, to an automatic driving vehicle for the user of the plurality of automatic driving vehicles, a command to travel in such a manner that the automatic driving vehicle for the user arrives at the building before the estimated time of the user's going out based on the request.

\* \* \* \* \*